(12) United States Patent
Dooley

(10) Patent No.: US 9,614,472 B2
(45) Date of Patent: Apr. 4, 2017

(54) SYSTEM FOR MONITORING TEMPERATURE INSIDE ELECTRIC MACHINES

(71) Applicant: Pratt & Whitney Canada Corp., Longueuil (CA)

(72) Inventor: Kevin Allan Dooley, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 137 days.

(21) Appl. No.: 14/068,546

(22) Filed: Oct. 31, 2013

(65) Prior Publication Data

US 2014/0055103 A1 Feb. 27, 2014

Related U.S. Application Data

(62) Division of application No. 11/419,239, filed on May 19, 2006, now Pat. No. 8,604,803.

(51) Int. Cl.
| | |
|---|---|
| *H02P 9/00* | (2006.01) |
| *B60L 3/00* | (2006.01) |
| *G01K 1/14* | (2006.01) |
| *G01K 7/16* | (2006.01) |
| *H02H 6/00* | (2006.01) |
| *H02P 29/64* | (2016.01) |
| *H02H 7/085* | (2006.01) |

(52) U.S. Cl.
CPC ............ *H02P 9/006* (2013.01); *B60L 3/0023* (2013.01); *G01K 1/14* (2013.01); *G01K 7/16* (2013.01); *H02H 6/005* (2013.01); *H02P 29/64* (2016.02); *G01K 2217/00* (2013.01); *H02H 7/085* (2013.01); *Y02T 10/642* (2013.01)

(58) Field of Classification Search
CPC .......... H02P 9/006; H60L 3/0023; G01K 1/14
USPC ........................................................ 324/546
See application file for complete search history.

(56) References Cited

U.S. PATENT DOCUMENTS

| | | | |
|---|---|---|---|
| 2,578,455 | A | 12/1951 | Seely |
| 2,912,644 | A | 11/1959 | Makous |
| 2,922,943 | A | 1/1960 | Rupp |
| 3,195,044 | A | 7/1965 | Flanagan |
| 3,207,980 | A | 9/1965 | Shockroo et al. |
| 3,210,657 | A | 10/1965 | Flanagan |
| 4,083,001 | A | 4/1978 | Paice |

(Continued)

FOREIGN PATENT DOCUMENTS

| | | |
|---|---|---|
| CA | 1191719 | 8/1985 |
| CA | 2170011 C | 8/1997 |

(Continued)

OTHER PUBLICATIONS

Response to Office Action dated Nov. 22, 2013 re: Canadian patent application No. 2,644,038.

(Continued)

*Primary Examiner* — Thomas Valone
(74) *Attorney, Agent, or Firm* — Norton Rose Fulbright Canada LLP

(57) ABSTRACT

The electric machine comprises at least one winding made of a material having a temperature dependent resistance. The temperature of the winding is monitored using the resistance therein. Temperatures or resistances indicative of a fault can be sensed, and corrective action taken, without the need for dedicated temperature sensors.

4 Claims, 3 Drawing Sheets

(56) References Cited

U.S. PATENT DOCUMENTS

| | | | |
|---|---|---|---|
| 4,413,325 | A | 11/1983 | Eifner |
| 4,454,465 | A | 6/1984 | Greene |
| 4,554,491 | A | 11/1985 | Plunkett |
| 4,899,074 | A | 2/1990 | West |
| 5,153,506 | A | 10/1992 | Trenkler et al. |
| 5,446,362 | A | 8/1995 | Vanek |
| 5,510,687 | A * | 4/1996 | Ursworth et al. ............ 318/727 |
| 6,064,172 | A | 5/2000 | Kuznetsov |
| 6,118,186 | A * | 9/2000 | Scott et al. ................. 290/40 B |
| 6,262,550 | B1 | 7/2001 | Kliman et al. |
| 6,297,742 | B1 | 10/2001 | Canada et al. |
| 6,323,658 | B1 | 11/2001 | Kendig et al. |
| 6,496,782 | B1 | 12/2002 | Claus et al. |
| 6,949,945 | B2 | 9/2005 | Klein |
| 6,965,183 | B2 | 11/2005 | Dooley |
| 7,242,166 | B2 | 7/2007 | Swahn et al. |
| 7,262,539 | B2 | 8/2007 | Dooley |
| 7,265,954 | B2 | 9/2007 | Hikawa et al. |
| 8,604,803 | B2 | 12/2013 | Dooley |
| 2003/0034793 | A1 | 2/2003 | Lee |
| 2003/0111976 | A1 | 6/2003 | Kumar |
| 2004/0212342 | A1 | 10/2004 | Batson |
| 2004/0239202 | A1 | 12/2004 | Dooley |
| 2009/0051311 | A1 | 2/2009 | Lu et al. |
| 2010/0194329 | A1 | 8/2010 | Lu et al. |

FOREIGN PATENT DOCUMENTS

| | | |
|---|---|---|
| EP | 0726632 | 8/1996 |
| WO | 02087050 | 10/2002 |
| WO | 2006056040 | 6/2006 |

OTHER PUBLICATIONS

EP Search Report, EP07252053; Jun. 24, 2010.
International Search Report, PCT/CA2007/000712, Jul. 31, 2007.
Office Action dated May 9, 2013 re: U.S. Appl. No. 11/419,239.
Response to Office Action dated May 9, 2013 re: U.S. Appl. No. 11/419,239.
Office Action dated Aug. 14, 2012 re: U.S. Appl. No. 11/419,239.
Response to Office Action dated Aug. 14, 2012 re: U.S. Appl. No. 11/419,239.
Office Action dated Feb. 17, 2012 re: U.S. Appl. No. 11/419,239.
Response to Office Action dated Feb. 17, 2012 re: U.S. Appl. No. 11/419,239.
Office Action dated Oct. 26, 2011 re: U.S. Appl. No. 11/419,239.
Applicant-Initiated Interview Summary dated Jan. 18, 2012 re U.S. Appl. No. 11/419,239.
Response to Office Action dated Oct. 26, 2011 and Summary of Interview re: U.S. Appl. No. 11/419,239.
Office Action dated Apr. 25, 2011 re: U.S. Appl. No. 11/419,239.
Response to Office Action dated Apr. 25, 2011 re: U.S. Appl. No. 11/419,239.
Notice of Panel Decision from Pre-Appeal Brief Review dated Feb. 15, 2011 re: U.S. Appl. No. 11/419,239.
Office Action dated Aug. 13, 2010 re: U.S. Appl. No. 11/419,239.
Uspto Communication dated Dec. 1, 2010 re: U.S. Appl. No. 11/419,239.
Pre-Appeal Brief Request for Review in response to Office Action dated Aug. 13, 2010 re: U.S. Appl. No. 11/419,239.
Office Action dated Feb. 24, 2010 re: U.S. Appl. No. 11/419,239.
Interview Summary dated Jul. 27, 2010 re: U.S. Appl. No. 11/419,239.
Response to Office Action dated Feb. 24, 2010 and Summary of Interview re: U.S. Appl. No. 11/419,239.
Office Action dated Sep. 9, 2009 re: U.S. Appl. No. 11/419,239.
Response to Office Action dated Sep. 9, 2009 re: U.S. Appl. No. 11/419,239.
Office Action dated Feb. 12, 2009 re: U.S. Appl. No. 11/419,239.
Response to Office Action dated Feb. 12, 2009 re: U.S. Appl. No. 11/419,239.
Office Action dated Jun. 16, 2008 re: U.S. Appl. No. 11/419,239.
Response to Office Action dated Jun. 16, 2008 re: U.S. Appl. No. 11/419,239.
Office Action dated Jan. 9, 2008 re: U.S. Appl. No. 11/419,239.
Response to Office Action dated Jan. 9, 2008 re: U.S. Appl. No. 11/419,239.
Office Action dated Apr. 19, 2007 re: U.S. Appl. No. 11/419,239.
Response to Office Action dated Apr. 19, 2007 re: U.S. Appl. No. 11/419,239.
Office Action dated Sep. 25, 2006 re: U.S. Appl. No. 11/419,239.
Response to Office Action dated Sep. 25, 2006 re: U.S. Appl. No. 11/419,239.
Office Action dated Nov. 22, 2013 re: CA patent application No. 2,644,038.
Office Action dated Feb. 11, 2015 re: Canadian patent application No. 2,644,038.
Office Action dated Jan. 22, 2016 re: CA patent application No. 2,644,038.
Response to Office Action dated Feb. 11, 2015 re: Canadian patent application No. 2,644,038, filed Aug. 7, 2015, Canada.

* cited by examiner

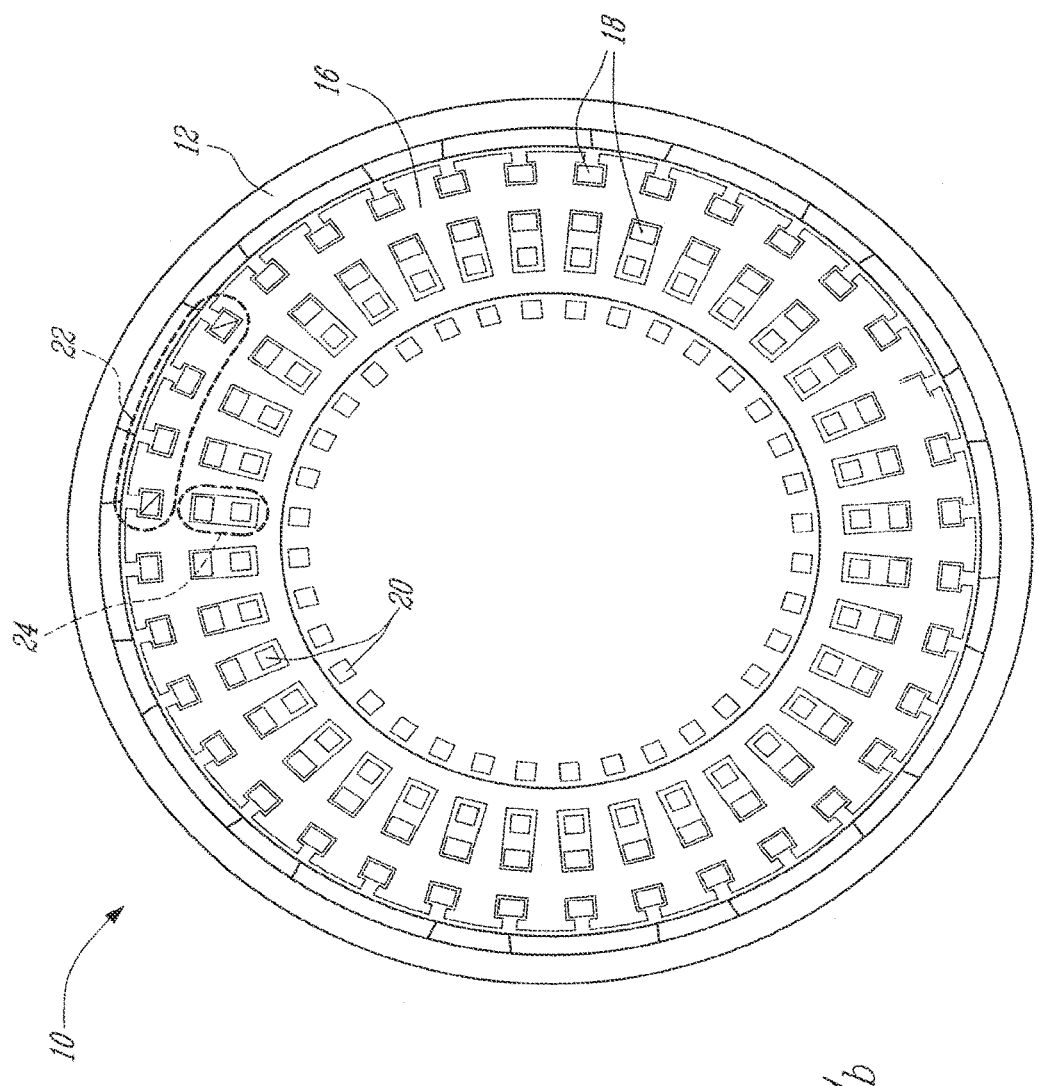

SYSTEM FOR MONITORING TEMPERATURE INSIDE ELECTRIC MACHINES

CROSS-REFERENCE TO RELATED APPLICATION AND CLAIM OF PRIORITY

The present application is a divisional of U.S. patent application Ser No. 11/419,239, filed May 19, 2006, the entire contents of which are hereby incorporated by reference.

TECHNICAL FIELD

The invention relates to temperature monitoring inside electric machines.

BACKGROUND

In the unlikely event of a turn to turn short-circuit or other electrical fault inside an electric machine such as a motor or generator, the temperature at the faulted winding can become significantly elevated and thereby pose a risk to the continued operation of the machine. However, no other symptoms may be evident initially, until the insulation of the winding deteriorates to a significant level, after which a more serious thermal condition may result. Providing temperature sensors to sense a high temperature within a faulted winding can detect a fault, however, such arrangement adds complexity to the electric machine. Room for improvement exists.

SUMMARY

In one aspect, the present invention provides a method for monitoring temperature of at least one winding of an electric machine, the winding having a temperature dependant resistance, the method comprising: determining a resistance of the winding while in operation; and determining a winding temperature of the winding using the resistance therein.

In another aspect, the invention provides a system for monitoring temperature of at least one winding of an electric machine, each winding having an electrical resistance which changes with temperature, the system comprising: a monitor adapted to determine a value indicative of the instantaneous resistance in at least a portion of the at least one winding; and a processor adapted to calculate an instantaneous temperature based on the resistance, and determine the presence of a fault condition based on the temperature.

In a further aspect, there is provided an electric generator system comprising a generator having a permanent magnet rotor and a stator, the stator having at least one output winding connected to a generator load and at least one control winding, the windings disposed in stator slots, the stator defining a first magnetic circuit passing through the stator around a portion of the at least one output winding, the stator defining a second magnetic circuit passing through the stator around another portion of the at least one output winding and a portion of the at least control winding, the first and second magnetic circuits remote from one another, the at least one control winding having an electrical resistance which varies with temperature; a current source connected to the at least one control winding adapted to provide variable DC current thereto, the source and the at least one control winding providing a control circuit; and a fault detection apparatus connected to the control circuit, the fault detection apparatus adapted to determine an electrical resistance of the at least one control winding and detect a fault therefrom.

BRIEF DESCRIPTION OF THE FIGURES

Reference will now be made to the accompanying figures, in which:

FIGS. 1a and 1b are a schematic cross-sectional views of examples of an electric machine suitable for use with the present invention.

DETAILED DESCRIPTION

Figure 1A:
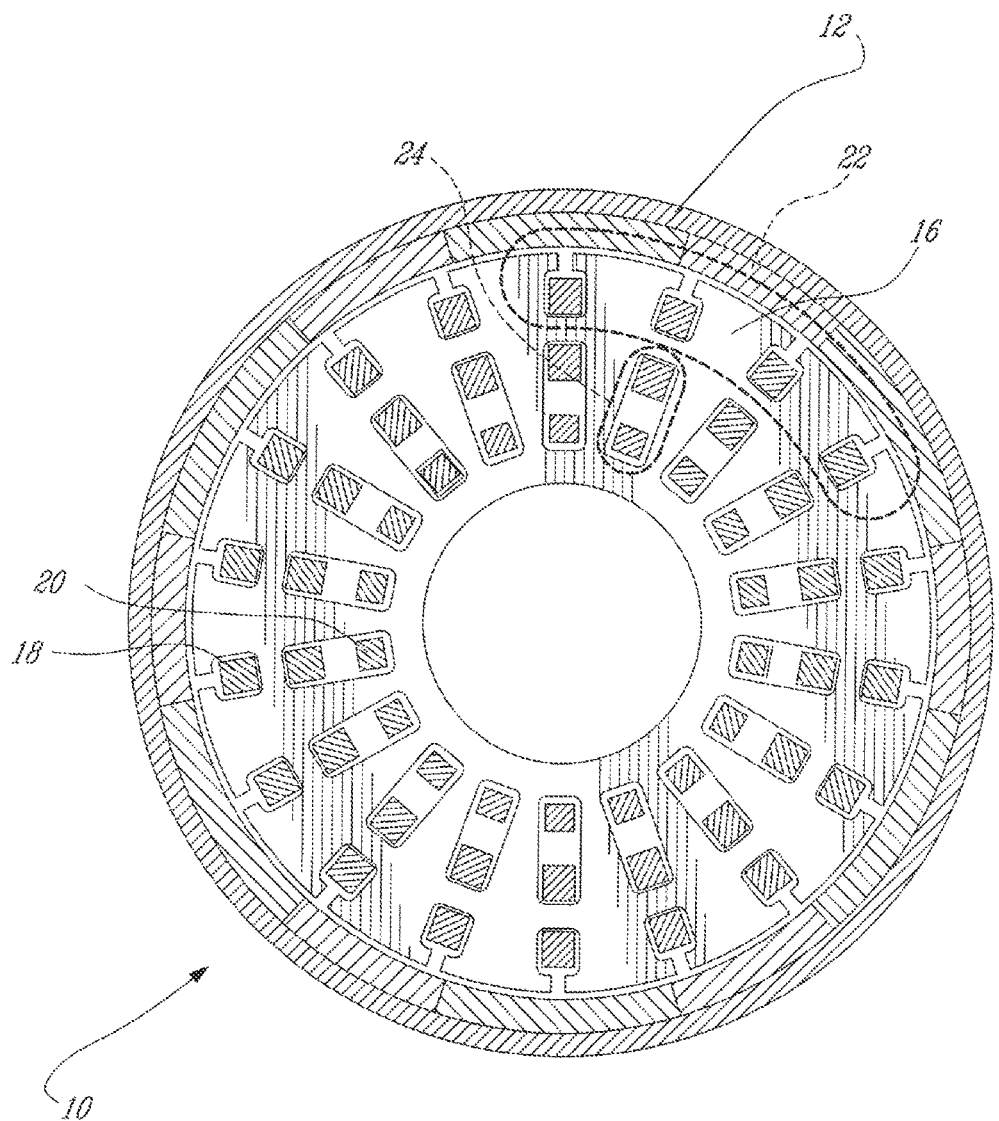

FIG. 1a shows an example of an electric machine 10 of the general type described in applicant's U.S. Pat. No. 6,965,183, while FIG. 1b shows an example of an electric machine of the general type described in applicant's co-pending application Ser. No. 10/996,411, both incorporated herein by reference. In both cases, the machine 10 can be used as a motor and/or a generator, and includes a rotor 12 (a permanent magnet rotor is shown in the figures) and a stator 16 having a plurality of primary windings 18 and secondary windings 20. The primary windings 18 generate output power in response to rotor rotation (generator) or create a rotating electromagnetic field to cause rotor rotation (motor). The secondary windings 20 are used to control the operation of the electric machine 10 through affecting primary windings 18, as described in the incorporated references. A rotor magnetic circuit 22 and a secondary magnetic circuit 24 are defined in the stator 16 for directing magnetic flux within the machine 10. Secondary windings 20 are preferably aluminium, copper or other material (whether pure, alloy or composite, etc.) in which material temperature affects the material's electrical resistivity.

Figure 2:
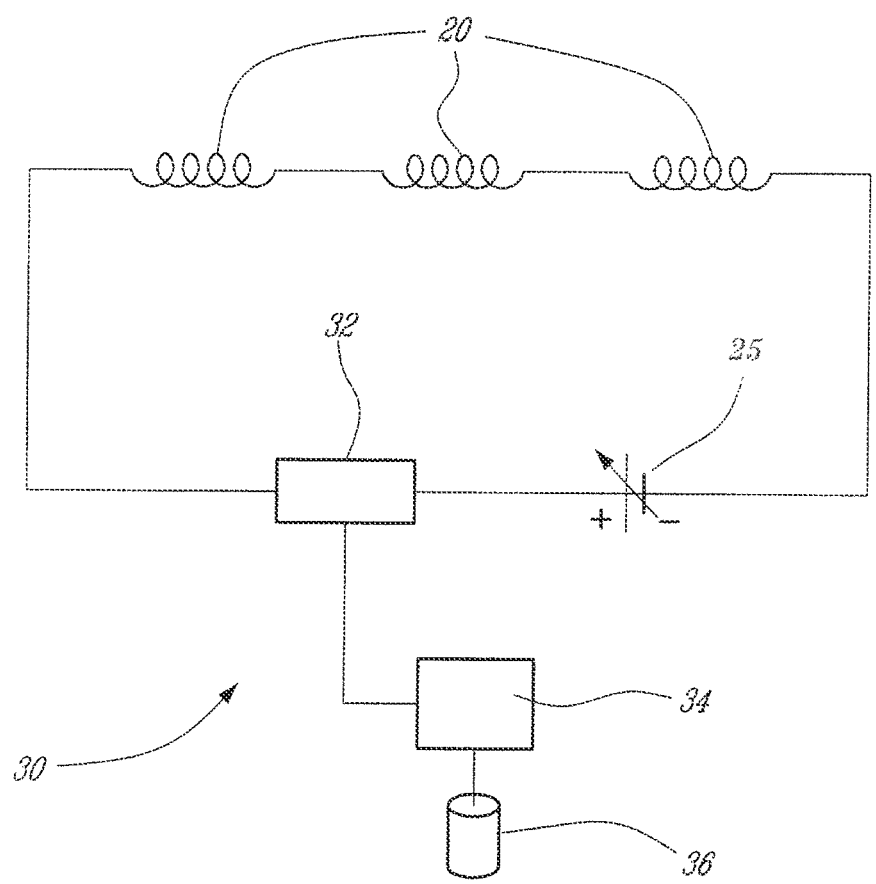
FIG. 2 is a block diagram showing an example of a system for monitoring the temperature of an electric machine winding.

FIG. 2 schematically illustrates an example of a system 30 for monitoring the temperature of one or more secondary windings 20 (three windings connected in series are shown in this example), while machine 10 is in operation without the need for dedicated temperature sensors or thermocouples. The system 30 comprises a monitoring device 32 connected in series with the windings of interest, in this case secondary windings 20. If there is more than one set of target windings in the machine 10, more than one monitoring unit 32 per machine may be provided.

The secondary windings 20 of machine 10 actually comprise a plurality of windings that are connected in series, and are also connected to a voltage source, in this case preferably a variable DC source 25. The monitoring device 32 is adapted to determine parameters used to determine winding resistivity, such as voltage and current in the secondary windings 20.

Once obtained, the parameters are sent to a processor 34, which may or may not be integrated within the monitoring device 32, as desired. The processor 34 calculates the instantaneous winding resistance based on the provided parameters. In this case, the voltage and the current data is used to obtain the resistance simply using Ohm's law (i.e. V=IR). Other parameters and other techniques may be used. Whatever the technique used, by monitoring relevant operational parameters of the target winding, such as voltage and current flow through the control windings 20, one can monitor resistance. When the target windings are made of a temperature dependent material, for instance aluminium or copper, the temperature of the windings may be determined from the resistance. This could be done, for instance, using a suitable algorithm in the processor 34, or by using a look-up table stored in a memory 36, or in any other suitable manner.

In use, in the event of a short-circuit causing the local temperature in the faulty winding to increase, thereby changing its resistance, the average resistance of the winding or windings will correspondingly increase, and this will be detected by the system. Comparison of a resistance change against a selected threshold will indicate the existence of a fault or other condition requiring attention. Upon detection of a resistance change indicative of a fault condition, a suitable corrective action can be taken, such as to notify a machine operator, to notify a machine controller for automatic machine shutdown or other fault mitigation, and/or to notify a machine maintenance monitoring system for logging an appropriate maintenance action, to name just a few. As well, gradual changes in resistance may be monitored over time for an overall indication of a health trend of the machine, and parameters indicating that a presently operational machine may soon become subject to a fault can be sensed, the fault predicted and an appropriate corrective action taken in advance of any occurrence of the fault.

As can be appreciated, the present system and method can be used to monitor the temperature inside the electric machine without a need of dedicated temperature sensors therein. The system can also be used as an additional monitoring system, if required, when dedicated temperature sensors are provided.

The above description is meant to be exemplary only, and one skilled in the art will recognize that other changes may also be made to the embodiments described without departing from the scope of the invention disclosed as defined by the appended claims. For instance, the present invention is not limited for use with the machine as shown in FIGS. 1 and 2, and it may be used with other suitable machine designs as well. The type and nature of the windings monitored may be any suitable, and the material of which the target windings are made may likewise be any suitable. The monitoring of the winding's parameters may be done in any suitable manner, and any suitable technique may be used to determine the winding's resistance. Other changes from the described embodiment may be apparent to the skilled reader, and are not meant to be excluded from the scope of the appended claims merely because all possible variants and changes have not been exhaustively described.

What is claimed is:

1. An electric generator system comprising:
   a generator having a permanent magnet rotor and a stator, the stator having a plurality of primary windings configured to generate output power in response to rotation of the rotor when connected to a generator load and a plurality of series-connected secondary windings configured to control the operation of the generator through affecting the plurality of primary windings, the plurality of series-connected secondary windings having an electrical resistance which varies with temperature;
   a current source connected in series with the plurality of series-connected secondary windings and adapted to provide a variable DC control current to the plurality of series-connected secondary windings to control the operation of the generator by affecting the plurality of primary windings, the current source and the plurality of series-connected secondary windings providing a control circuit; and
   a fault detection apparatus connected to the control circuit, the fault detection apparatus adapted to determine an electrical resistance of the plurality of series-connected secondary windings as an indication of temperature of the plurality of series-connected secondary windings based on the variable DC control current provided to the plurality of series-connected secondary windings and detect a fault from the determined electrical resistance.

2. The system of claim 1 wherein the resistance is an average resistance across the plurality of series-connected secondary windings.

3. The system of claim 1 wherein the fault detection apparatus is connected in series with the plurality of series-connected secondary windings.

4. The system of claim 3 wherein the fault detection apparatus is adapted to determine a voltage drop across the plurality of series-connected secondary windings and the current passing through the plurality of series-connected secondary windings.

* * * * *